United States Patent

Spielberg

[11] 3,968,786
[45] July 13, 1976

[54] SOLAR HEAT ABSORBING TUBING
[75] Inventor: David H. Spielberg, Schaumburg, Ill.
[73] Assignee: Universal Oil Products Company, Des Plaines, Ill.
[22] Filed: May 15, 1974
[21] Appl. No.: 470,254

[52] U.S. Cl. .............................. 126/270; 165/133; 126/271
[51] Int. Cl.² ........................................... F24J 3/02
[58] Field of Search ............ 126/270, 271; 165/133; 138/145

[56] References Cited
UNITED STATES PATENTS

| 1,880,938 | 10/1932 | Emmet | 126/271 |
|---|---|---|---|
| 2,907,318 | 10/1959 | Awot | 165/133 |
| 2,917,817 | 12/1959 | Tabor | 126/270 |
| 3,022,781 | 2/1962 | Andrassy | 126/271 |
| 3,072,420 | 1/1963 | Yellot | 126/271 X |
| 3,079,273 | 2/1963 | Johnson | 165/133 |
| 3,174,915 | 3/1965 | Edlin | 126/271 X |
| 3,227,153 | 1/1966 | Godel et al. | 126/271 |
| 3,239,000 | 3/1966 | Meagher | 126/271 X |
| 3,265,124 | 8/1966 | Reys | 165/133 |
| 3,310,102 | 3/1967 | Trombe | 126/271 |

Primary Examiner—John J. Camby
Assistant Examiner—Henry C. Yuen
Attorney, Agent, or Firm—James R. Hoatson, Jr.; Philip T. Liggett; William H. Page II

[57] ABSTRACT

An improved form of solar heat absorbing tubing comprises a plastic material which contains small subdivided black body absorber particles being fully distributed throughout the thickness of the tubing. A preferred form of tubing will utilize electrical conductive carbon, or carbonized particles, in an amount to provide conductivity to the resulting tubing such that there may be electroplating or electrostatic spray coating for the tubing to still further enhance its absorptive and reradiation properties.

7 Claims, 3 Drawing Figures

SOLAR HEAT ABSORBING TUBING

The present invention relates to an improved form of tubing for use in solar heat collectors.

More particularly, the invention is directed to providing a tubing which comprises a plastic material incorporating finely divided black body heat absorbing particles that will be fully distributed throughout the thickness of the tubing. As will be more fully set forth hereinafter, it is also preferable that the particulates are electrically conductive so as to provide a resulting tubular member which will be electrically conductive to provide for plating or form electrostatic coating that will enhance its heat retaining properties.

BACKGROUND OF THE INVENTION

It is generally well known that solar energy heat collecting tubing should be dark in color or have a black or dark colored coating in order to enhance the heat absorption characteristics of the surface. A truly reflective body will reflect essentially the same spectrum which impinges upon it while a black body emits a shifted, lower energy and longer wavelength spectrum. Stated another way, the difference in energy between the incident and reemitted radiation for a black body material is the absorbed energy which goes into heat within such black body material.

In addition to the advantages of using black body absorbing materials for the collection of solar heat, it is also generally known that there is improved efficiency in having a suitable covering over the absorbing surface in order to hold the heat in the collector system by the "greenhouse effect". For example, window glass and certain plastics have selective transmitting properties where the lower wavelength spectrum of the solar energy can pass through to the heat absorbing tubing, but the higher wavelength radiation from the reradiation is not readily transmitted.

It is also generally understood that plastic materials have had various types of fillers in admixture therewith to provide improved strength, or to improve a particular characteristic. For instance, carbon particles have been used to resist ultraviolet ray deterioration. However, it is not known that conductive carbon particles have been used in tubing to provide black body heat absorption and resulting conductive or semiconductive tubing for solar heat collectors.

SUMMARY OF THE INVENTION

In the present instance, it is a principal object of the invention to provide a solar energy collector tubing by utilizing a suitable plastic binder material which contains finely divided black body particulates that will be distributed throughout the thickness of the material and will thus be primarily below the surface of the plastic binder. As a result there can be heat absorption in the particles themselves from their selective emissivity properties to preclude reflection and heat radiation therefrom. At the same time there can be selective transmittance on the part of the encompassing plastic binding material of the tubing to preclude passage of the higher wavelength spectrum, or reradiated heat.

It may also be considered an object of the present invention to use finely divided electrically conductive black body material in the plastic binder in an amount which will provide a conductive or semiconductive tubing. For example, conductive carbon particles or pyropolymeric semiconducting organic-refractory oxide type of particles can be used to provide a suitable, at least partially conductive, tubing.

In a related aspect, it may be considered an object of the invention to provide a conductive, black body containing tubing which can be readily electroplated or electrostatically spray coated with an ultrathin metal coating to effect a desirable selective absorption property to the surface of the plastic tubing.

Briefly, the present invention provides an improved form of heat absorbing tubing to, in turn, provide enhanced solar radiation collection efficiency which comprises in combination, a tubular form member of plastic material containing small black body absorber particles distributed throughout the thickness thereof, whereby there is improved heat absorption and a reduction in long wavelength emissions.

The ultraviolet light between the atmospheric absorption cutoff of 0.29 microns and the lower edge of the visible spectrum, 0.4 microns is called the solar ultraviolet. A suitable plastic binder will be transparent to this solar ultraviolet radiation, allowing the black body material in the binder to absorb the radiant energy. In addition the plastic binder will preferably transmit the remainder of the solar radiation spectrum, i.e., from about 0.3 to about 1.2 microns. Various types of plastic materials may be used and it is not intended to limit the present invention to any one type of such material. For example, the optical properties of acrylic ester resins, as well as their ease of forming and stability to heat and light make them suitable candidates. Poly(-methyl methacrylate) transmits extensively in the solar ultraviolet range and has almost perfect transmission in the visible range. Other polymers, such as polystyrene, aliphatic polyesters, cellulose esters, and polyamides, contain groups that also show considerable transmittance in the solar ultraviolet.

Some commercial polymers are made up of structures that have absorption maxima in the solar ultraviolet region, and for this reason are unsuitable. Examples of these include polysulfones, terephthalate polyesters, and some polyurethanes. As briefly noted hereinbefore, it is an advantage in a preferred embodiment to make use of those plastics which will selectively transmit the lower wavelength radiations from the solar energy such that the absorption may take place within the black body material of the tubing, but will minimize reradiation by virtue of the lesser ability to pass the higher value wavelength radiations. For instance, polyvinyl chloride will transmit the lower wavelength solar radiations below about 5.5 microns but is inefficient in transmitting the higher wavelength radiations. Most polymers will not transmit infrared radiation efficiently with the exception of halogenated polyethylenes.

Most all of the thermoplastic and thermosetting plastic materials are sensitive to sunlight and tend to deteriorate and crack unless there have been additive materials to provide stabilization and antioxidation properties into the binder material. In general, various types of antioxidation additives may be used and should have no effect with respect to interferring with the present improved type of composition for a solar heat collecting tubing. Actually, the darkening of plastic materials through the aging process will in no way be harmful to the collector tubing inasmuch as the resulting improved tubing will be black from the black body material being combined with the plastic binder material in order to enhance the heat absorbing properties.

With respect to the black body material to be mixed or otherwise combined with the plastic binding material to form the desired heat absorbing tubing, the particles may comprise any one of a variety of well-known black heat absorbing matter. For example, the carbonaceous materials may comprise carbon blacks, channel black, oil furnace black, lamp black and the like, or even crushed natural materials such as coal, coke, charcoal, etc. However, in accordance with a preferred embodiment for the present heat collecting tubing, the black body carbonaceous material will be of an electrically conductive type of carbon, such as graphite, so that the resulting tubing will have a conductive or semiconductive property.

It is also a particular feature of the present invention to provide a solar heat collecting tubing which is formed from the complex of a plastic binder material and pyropolymeric conductive organic-refractory oxide particles such that there is a resulting tubing which can possess a controlled electrical conductivity. This type of material is described in U.S. Pat. No. 3,651,386, issued Mar. 21, 1972. The material is formed by the deposition of the pyropolymer on the surface of a base material at a relatively high temperature in the range of from 400° to 750° C. Organic substances such as aliphatic hydrocarbons, cycloaliphatic hydrocarbons, aromatic hydrocarbons, aliphatic halogen derivatives, aliphatic oxygen derivatives, carbohydrates, etc., may be pyrolyzed over the surface of a subdivided refractory oxide material. The refractory oxide may be alumina in various forms, such as gamma-alumina and silica-alumina; however, various other refractory oxides may be used. Preferably, the carbonaceous pyropolymer, the graphite or other carbonaceous material which is to be combined with the plastic binder will be utilized as a finely divided powder where the particulates are generally of about 10 micron in size or less. These particle sizes can be obtained by milling the filler material in a volatile solvent medium by means of a roll mill, colloidal mill or ball mill and thereafter flashing off or evaporating the solvent to obtain the dried powder. It is also to be noted that the carbonaceous filler material need not be in the finely divided powder form, inasmuch as ultrafine diameter strands or fibers which have the carbonaceous coating may well be utilized. For example, small diameter fibers or filaments may be of a refractory inorganic oxide and may be made in accordance with teachings of U.S. Pat. No. 3,614,809, issued Oct. 26, 1971. This type of refractory fiber may be chopped into short lengths and subjected to the treatment of U.S. Pat. No. 3,651,386 to in turn provide a desired carbonaceous pyropolymer with electrical conductivity properties.

The heat absorbing tubing may have varying amounts of the carbonaceous material but will typically contain from about 10 to about 95% by weight of the finished composition. Preferably, the higher the amount of black body material the greater is the heat absorption capability of heat absorbing tubing. Also, a relatively large volume percent of carbonaceous material within the finished tubing will provide greater conductivity for the tubing. Conductivity is of advantage in two aspects with respect to solar heat absorbing tubing, as for example (1) an electrical conductive property will permit the leakage of electrostatic charges on the tubing and will help dissipate or prevent dust collection on the tubing to in turn reduce maintenance aspects; and (2) a tubing which is electrically conductive can provide for an electroplating or electrostatic coating to permit the addition of a thin selectively absorbing type of coating over the tubing.

In a preferred embodiment of the finished tubing, it may be of advantage to add a very thin electroplated or electrostatically coated layer of a metal such as copper, nickel, chromium, cobalt, silver, etc., which helps reduce the reradiation of the higher wavelength radiations, while at the same time permitting the lower wavelength solar energy to pass through into the black body material. Where the tubing is sufficiently electrically conductive then such tubing may serve as its own electrode in an electroplating type of operation such that there is the direct deposition of a desired metal component onto the surface of the tubing. Also, an electrically conductive tubing will permit an electrostatic type of coating operation, where there is a suitable charging of the tubing such that there can be an adhering coating of particles from the spraying of powdered metals onto the surface of the tubing and then the subsequent binding therewith in a suitable elevated temperature heating operation. Such types of selectively absorbing coatings may be unnecessary with the use of certain of the selective types of plastic materials, such as the aforementioned poly(methyl methacrylate) binder material which has selective transmission properties but can be of particular advantage in connection with all of the various binders that do not provide the integrated "greenhouse effect" described hereinbefore.

DESCRIPTION OF THE DRAWING

The present invention may be further described and explained by reference to the accompanying drawing and following description thereof.

Figure 1:
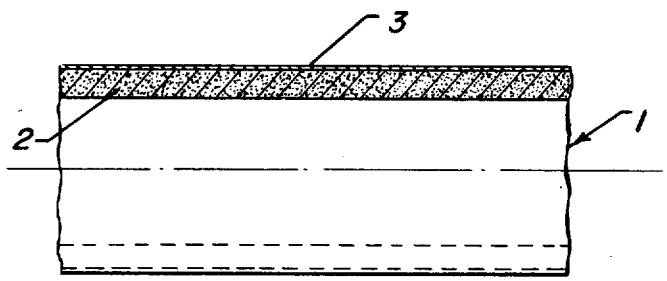
FIG. 1 of the drawing is a sectional view through a portion of tubing which is prepared in accordance with the present invention.

Referring now particularly to FIG. 1 of the drawing, there is indicated a tubing 1 which is formed from a complex of a thermoplastic material, or thermal setting plastic material, as a binder having a high percentage of carbonaceous black body material 2 which is distributed throughout the full thickness of the tubing. In addition, there is indicated an ultrathin coating layer 3 over the outer surface of the tubing. As heretofore noted, the black body material may comprise carbon or a carbonaceous pyropolymer formed on a refractory oxide base material in order to provide a high degree of black body effect and the preclusion of the reradiation of a higher wavelength spectrum received from the solar energy. In general, the greater the quantity of black body material and the darker the coloration of the resulting tubing, the better is the efficiency provided from the use of the resulting ray absorbing tubing. Also, as heretofore noted, in order to obtain the desirable aspects of having an electrically conductive tubing which can bleed off electrostatic charges there will generally be required a high content of conductive black body material in the resulting tubing.

Although not heretofore set forth, it should be noted that the powdered filler material, or the carbonized refractory oxide filament pieces, will have a desirable reinforcing effect on the resulting plastic tubing to provide a higher melting point for the tubing and increase structural rigidity. As still another aspect, the utilization of the black body carbonaceous material will assist in ultraviolet stabilization properties for the plastic binding material. Additional free radical inhibiting additives might also be included provided they did not alter the transmission properties of the plastic binder in the solar ultraviolet region.

The exterior coating 3 to provide a selectively absorbing type of surface may, to some degree, be considered optional, depending upon the type of plastic binder material being utilized to form the tubing. In other words, as heretofore noted, where the plastic binder does not provide a desirable greenhouse effect to preclude reradiation of the higher wavelength radiation, then it is desirable to add a very thin film of a suitable metal component which will provide a selectively absorbing effect and preclude or inhibit reradiation. Such coatings may be provided in accordance with generally conventional methods of electroplating or electrostatic coating procedures which are well-known in the coating and plating arts and need not be set forth herein.

The present type of tubing may be utilized for positioning in front of flat plate reflecting means or within focusing collectors. Flat plate collectors are preferable in many instances in that they can diffuse solar radiation and perform to some extent on cloudy and overcast days. They may also be utilized in a fixed position and do not need to be moved to follow the sunlight. On the other hand, the focusing type of collectors can generate much higher operating temperatures and are thus capable of higher efficiencies.

Figure 2:
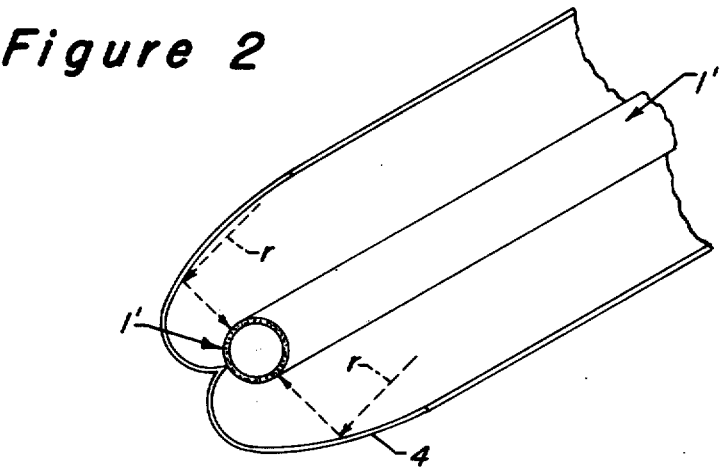
FIG. 2 of the drawing illustrates, in an isometric type of view, the placement of a solar collector tubing, such as provided by the present invention, within a focused ray reflector means having the shape of an involute of the cylindrical tubing.

Referring now to FIG. 2 of the drawing there is indicated a solar heat absorbing tube 1', which may be of the type shown and described in connection with FIG. 1 of the drawing, comprising a plastic binding material with a high volume of black body particulates that are of carbon or of a carbonaceous pyropolymer so as to be at least partially electrically conductive. Tube 1' is indicated as being within a special reflector 4 which will assist in focusing the solar radiation directly to the surface of the tubing and provide for heat transmission into a fluid stream which would pass through the interior of the tubing. Various types of fluid mediums and heat exchange arrangements may be utilized with respect to transmitting the energy from the heated fluid to heat storing or heat consuming means. The type of heat exchange system to be utilized does not comprise a part of the present invention.

Specifically, the reflector 4 is in the shape of an involute of the cylindrical tubing 1' and shall be sized proportional to the diameter of such tubing whereby the solar rays such as indicated at r will reflect from the interior surface of means 4 and be reflected to the exterior of tubing 1'. The reflector 4 may be a mirror or may comprise a smooth metal surface with a suitable reflective coating such as of titanium oxide, zinc oxide, calcium oxide, etc. Again, it is not intended to limit the present invention to any one type of reflector means for use in association with the improved type of black body containing tubular material.

Figure 3:
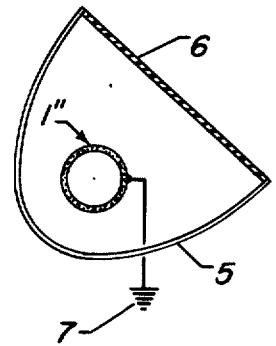
FIG. 3 of the drawing indicates diagrammatically another ray concentrating arrangement providing a parabolic reflector.

To illustrate variations in reflector or ray focusing members, reference may be made to FIG. 3 of the drawing where there is indicated diagrammatically the location of a tubular member 1" within a parabolic focusing member 5. As noted in connection with FIG. 2, the latter may comprise a typical mirror construction or may be constructed of a suitable smooth metal having a good interior reflective coating material which will assist in reflecting the solar rays toward the surface of tubular member 1".

In connection with FIG. 3 of the drawing, there is also indicated the placement of a covering glass or membrane 6 which will assist in minimizing heat losses from the absorbing tubular member 1". The glass or transparent membrane utilized at the location of member 6 can assist in giving a greenhouse effect by virtue of selective transmission of the solar energy and in particular being able to transmit the lower wavelength radiations more readily than the higher wavelength radiations. A covering member 6 may also be of value in preventing dust or dirt collections within the body of the reflector 5 and over the surface of the tubing 1". Still further, there is indicated the grounding of the tubing 1" through ground means 7 such that there may be the leakage, or bleed-off, of electrostatic electricity from the heat collecting tubing and the elimination of any propensity toward dust collection on the part of an electrostatically charged tubing.

Other ray concentrating or focusing arrangements may well be utilized in combination with the present improved form of tubing and various sizing of tubings may be utilized depending upon the size of the reflector means and the length of the tubing, or other factors which determine the size of a system and the amount of heated fluid to be accommodated within any one system.

I claim as my invention:

1. A heat absorbing tube providing enhanced solar radiation collection efficiency, which comprises in combination, a tubular member formed of plastic material containing a sufficient quantity of small electrical conductive black body absorber particles distributed throughout the thickness thereof to render said tubular member electrically conductive, and said black body particles being composed of conductive carbonaceous pyropolymer formed on a refractory oxide base material from a pyrolyzable organic material contacting said base material at a high temperature in the range of 400° to 750° C.

2. The heat absorbing tube of claim 1 further characterized in that said refractory oxide base material is alumina or silica-alumina.

3. The heat absorbing tube of claim 2 further characterized in that said refractory oxide base material is gamma-alumina.

4. The heat absorbing tube of claim 1 further characterized in that the black body particles are less than about 10 microns in size.

5. The heat absorber tube of claim 1 further characterized in that the plastic material has selective transparency for the transmission of lower wavelength radiations, particularly from about 0.3 microns to 1.2 microns and will minimize the transmittance for higher wavelength radiations.

6. The heat absorber tube of claim 1 further characterized in that the tubular member is provided with a thin coating of a metal component providing a selectively absorbing surface whereby to minimize reradiation of the solar radiation to the tubing.

7. The heat absorber tube of claim 1 further characterized in that a ray concentrating member is spaced from and coextensive with said tube to assist in focusing rays on said tube and said tube with said electrically conductive particles therein is grounded to bleed off electrostatic charges.

* * * * *